United States Patent
Chen et al.

(10) Patent No.: US 8,346,474 B2
(45) Date of Patent: Jan. 1, 2013

(54) METHOD OF ROUTE RETRIEVAL

(75) Inventors: Henry Chen, Beijing (CN); Tom Plocher, Hugo, MN (US); Conrad Bruce Beaulieu, Duluth, MN (US); Cheng Jun Li, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 761 days.

(21) Appl. No.: 12/200,158

(22) Filed: Aug. 28, 2008

(65) Prior Publication Data
US 2010/0057354 A1 Mar. 4, 2010

(51) Int. Cl.
*G01C 21/12* (2006.01)
(52) U.S. Cl. .................... 701/411
(58) Field of Classification Search ............ 701/411
See application file for complete search history.

(56) References Cited

U.S. PATENT DOCUMENTS

| | | | | |
|---|---|---|---|---|
| 6,611,207 | B1 * | 8/2003 | Yuan et al. | 340/630 |
| RE38,724 | E * | 4/2005 | Peterson | 701/209 |
| 7,587,274 | B2 * | 9/2009 | Kaldewey et al. | 701/208 |
| 7,945,386 | B2 * | 5/2011 | Lokshin et al. | 701/416 |
| 2005/0128070 | A1 | 6/2005 | Faltesek et al. | |
| 2006/0247849 | A1 * | 11/2006 | Mohsini et al. | 701/206 |
| 2007/0019071 | A1 * | 1/2007 | Haynes | 348/135 |
| 2007/0050132 | A1 * | 3/2007 | Ho et al. | 701/209 |
| 2007/0132756 | A1 | 6/2007 | Plocher et al. | |
| 2007/0279210 | A1 | 12/2007 | Li et al. | |
| 2008/0157984 | A1 | 7/2008 | Li et al. | |
| 2008/0317345 | A1 * | 12/2008 | Wiedemann et al. | 382/181 |

FOREIGN PATENT DOCUMENTS

| | | |
|---|---|---|
| JP | 2003-240591 A | 8/2003 |
| JP | 2006-48278 A | 2/2006 |

OTHER PUBLICATIONS

Jiangeng Du; Yaping Huang; Chen, H "Construct three dimensional route from blue print image of building" issue Date Jul. 9, 2008, pp. 1743-1748.*
Geir Jensen, "Wayfinding in Heavy Smoke: Decisive Factors and Safety Products", May 1998, 11 pages.*
English translation of the Abstract of JP2003240591.
English translation of the Abstract of JP2006048278.
Lu et al., Capacity Constrained Routing Algorithms for Evacuation Planning: A Summary of the Results, Department of Computer Science and Engineering, University of Minnesota, available at http://www.spatial.cs.umn.edu/paper_ps/evac_55TD05.pdf.

* cited by examiner

*Primary Examiner* — Khoi Tran
*Assistant Examiner* — Kira Nguyen
(74) *Attorney, Agent, or Firm* — Husch Blackwell LLP (57) ABSTRACT

A method of route retrieval is provided comprising initializing a first weighted graph, converting a blueprint of an area into a weighted graph, updating the weighted graph in real time, and calculating an optimal route in the area.

14 Claims, 14 Drawing Sheets

FIG. 1

BUILDING BLUEPRINT
(ONLY A FLOOR)

WEIGHTED GRAPH GENERATION PROCESS

*FIG. 2A*

PATH AREA
(FOR HALLWAY)

WEIGHTED GRAPH GENERATION PROCESS

*FIG. 2B*

THE SINGLE PIXEL WIDTH CONNECTED CURVE, I
WEIGHTED GRAPH GENERATION PROCESS
*FIG. 2C*

THE SEGMENTED LINES, L
WEIGHTED GRAPH GENERATION PROCESS
*FIG. 2D*

THE WEIGHTED GRAPH INCORPORATING THE
SEGMENTED LINES, L
WEIGHTED GRAPH GENERATION PROCESS
*FIG. 2E*

THE WEIGHTED GRAPH WITH THE DISTANCE OF
EACH EDGE CALCULATED

WEIGHTED GRAPH GENERATION PROCESS

*FIG. 2F*

THE WEIGHTED GRAPH INCORPORATING ADDITIONAL
EDGES $E_{STAIRS}$ BETWEEN ADJACENT FLOORS

WEIGHTED GRAPH GENERATION PROCESS

*FIG. 2G*

THE PATH IN A 3D SCENE (FROM FRONT)
WEIGHTED GRAPH GENERATION PROCESS

*FIG. 2H*

THE PATH IN A 3D SCENE (FROM BACK)
WEIGHTED GRAPH GENERATION PROCESS

THE WEIGHTED GRAPH
A ROOM WITH COMPLEX STRUCTURE

SPLIT EDGES
THE WEIGHT UPDATE
*FIG. 5C*

JUST MODIFY THE WEIGHT OF AN EDGE
THE WEIGHT UPDATE
*FIG. 5B*

*FIG. 6*

GRAPH FOR THE EVACUATION NETWORK (INITIAL CONTENTS, NODE CAPACITY)

METHOD OF ROUTE RETRIEVAL

FILED OF INVENTION

The present invention relates generally to systems and methods of route retrieval. More particularly, the present invention relates to systems and methods to generate a weighted graph, update the weighted graph in real time, and compute an optimal path.

BACKGROUND

Retrieving a route or finding a way to or from a destination and visualizing the route are very important functions in a variety of applications including, for example, firefighting, evacuation for disaster, travel guiding, and building security. For example, in firefighting, it is necessary for a fire fighter to retrieve an optimal route to a fire location according to current conditions including, for example, shortest path, smoke density, temperature, closed fire shutters, people presence and density, locked doors, etc. Similarly, it is necessary for occupants of a building to find the best emergency route to evacuate the building to avoid, for example, a fire, a crime scene, or a terrorism incident.

In the application of travel guiding, for example, a building security system can necessitate retrieving a route in a building. Different visitors can have different privileges allowing them to walk in different zones of a building. Accordingly, it is necessary for different visitors to be able to retrieve a route to their respective destinations based on their respective privileges.

More examples of applications in which route retrieval is advantageous include determining a route to a safe haven for occupants of a building when a disaster such as a fire, crime, or terrorism occurs and determining a route for a medial first responder to reach a victim.

Methods to establish routes to and from a region are known in the art. For example, U.S. Publication No. 2005/0128070 to Faltesek et al. entitled "Building Emergency Path Finding Systems and Method," which is assigned to the assignee hereof and is hereby incorporated by reference, discloses a method to establish ingress and egress paths to and from a region by evaluating signals from a plurality of detectors. However, when conditions in the region and surrounding area change, it is desirable to establish updated routes to and from the region.

Accordingly, it is advantageous for route retrieval to occur in real time because the status of a building can vary over time. For example, the temperature and smoke density at a particular location in a building can change as fire and smoke spread in the building. Additionally, the number of evacuees on a particular route in a building may vary as the evacuees move towards exits. Furthermore, the connectivity between different zones in a building can change from time to time when, for example, fire doors are closed when a fire hazard exists, doors are locked due to security privileges, or floor plans are altered.

Other reasons for route retrieval to occur in real time include the presence or absence of emergency personnel at particular locations, movement of targeted individuals, and the presence of obstacles, for example, as detected by video sensors.

U.S. Publication No. 2007/0279210 to Li et al. entitled "Time-Dependent Classification and Signaling of Evacuation Route Safety," which is assigned to the assignee hereof and is hereby incorporated by reference, discloses an adaptive evacuation system and method for providing a safety route for evacuees. Li et al. discloses using sensors to evaluate whether a path is safe or unsafe. However, it is desirable to build a weighted graph to retrieve an optimal route within a region.

Weighted graphs to retrieve an optimal route are known in the art. However, weighted graphs have not previously been updated in real time based on changing conditions. As explained above, it is advantageous for route retrieval to occur in real time because the status of a building can vary over time. There is thus a continuing, on going need for a method and system to determine a route to a particular destination in real time. Preferably, such methods and systems generate a weighted graph, update the weighted graph in real time to account for changing conditions, and compute an optimal path between particular locations represented on the weighted graph.

DESCRIPTION OF THE PREFERRED EMBODIMENTS

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include a method and system to automatically generate a weighted graph from a building's or other environment's electronic blueprint. An electronic blueprint could include any digital representation of a space or geographic area with accompanying sensed data.

Other environments can include a ship, any other large building-like structure, a campus or a city. For ease of reference, embodiments of the present invention will be described herein with reference to a building. However, it is to be understood that the present invention is not limited to a building.

A representation of a building's topology can be generated including paths located within the building. Such a representation can then serve as input for retrieving a route within the building.

In embodiments of the claimed invention, a weighted graph can be used to represent information concerning building topology. A weighted graph is a set of nodes connected to one another by a set of edges. Nodes can represent a starting point, way point, or destination, and edges can represent bridges from one node to another, with weights assigned to each edge to describe the relative cost to travel across that particular edge.

In embodiments of the claimed invention, a building's compartments, such as rooms, stairs, elevators, cubicles, and the like, can be represented as nodes on a weighted graph, and portals in the building, such as doors, hallways, aisles, and the like, can be represented as edges on a weighted graph. Sub-weighted graphs can be generated for complex structures, such as rooms with various workspaces, and can be added to a primary weighted graph.

Nodes and edges can be assigned one or more weights that represent different node conditions according to an application domain. Sensors or predictive data in a building can initialize graph weights, and the weighted graph can be updated by modifying the weights of edges and by splitting or merging edges in real time according to sensed and predictive data.

An optimal route can be computed using a shortest path algorithm, routing method, or other method as known by those of skill in the art. The optimal route can be drawn on a building floor plan or onto a three-dimensional representation of the building and its floors.

Figure 1:
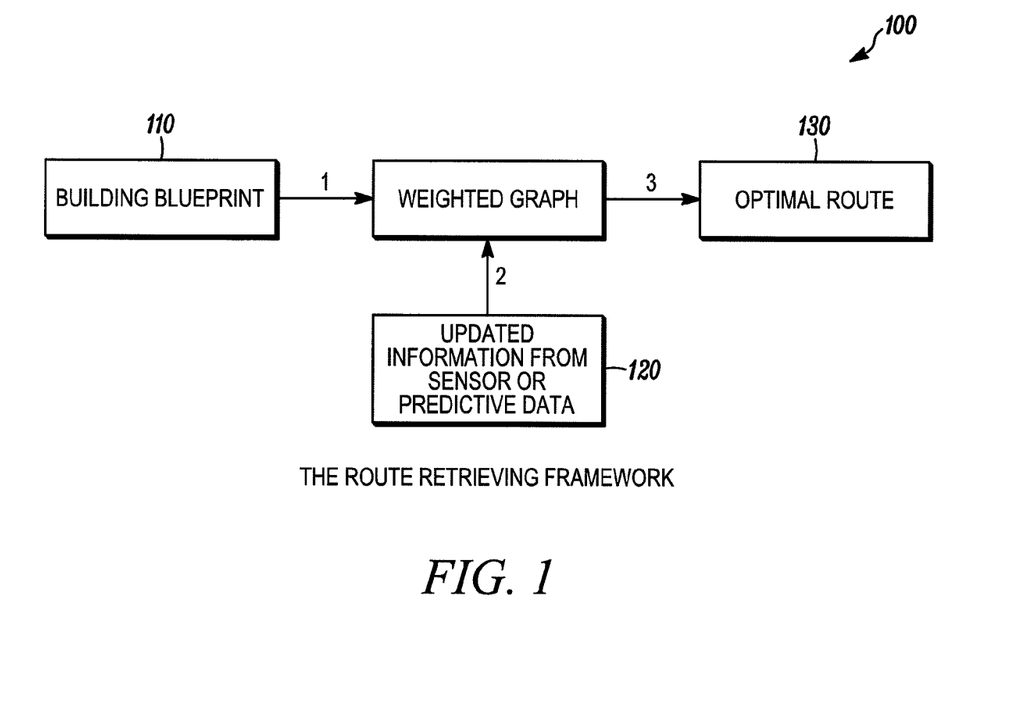
FIG. 1 illustrates a system and method of route retrieval in accordance with one embodiment of the present invention.

Referring to FIG. 1, a method of route retrieval in accordance with one embodiment of the present invention is shown. The method 100 can have three processes. The first process 110 can convert a building blueprint into a weighted graph. The second process 120 can update the weighted graph in real time using, for example, sensor data or predictive data. Finally, the third process 130 can retrieve an optimal route using, for example, a shortest path algorithm or network, a routing algorithm, or other methods for weighted graphs as are known to those of ordinary skill in the art.

It is to be understood that the processes of FIG. 1 can be implemented by at least one programmable computer or processor in combination with control software to detect sensed data changes, stored on a computer readable medium. One or more storage units, such as mass semiconductor memories or disk drives, can be coupled to the at least one computer. One or more data bases of regions of interest can be maintained on the storage units accessed by the computer and software combination in developing and modifying in real-time the directed route indicating graphs as explained herein. A display capable of multi-dimensional rendering can also be coupled to the computer directly or remotely. Control software can provide changing route information in real time as, for example, a fire or other condition develops.

Figure 7:
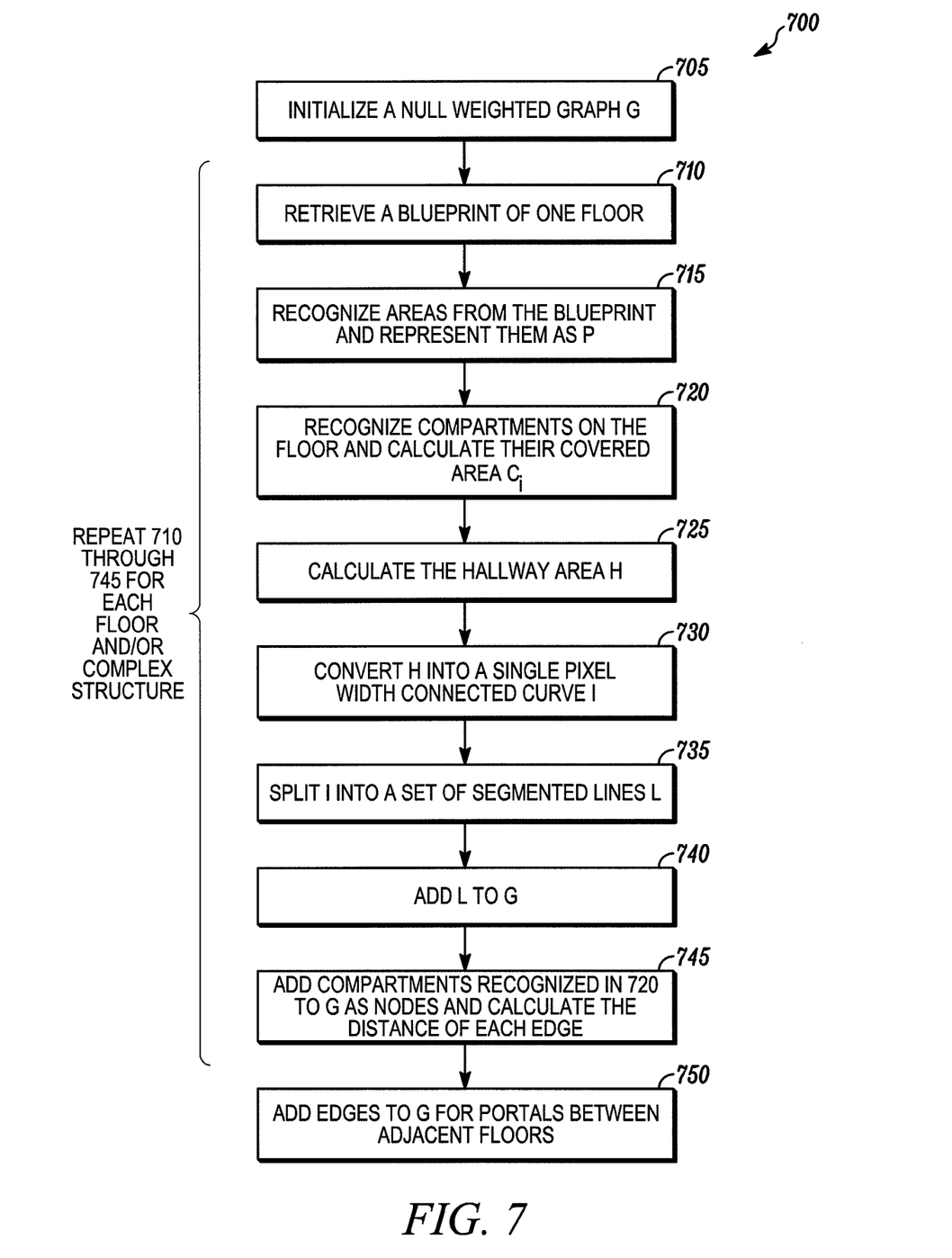
FIG. 7 is a method of operation of converting a building blueprint into a weighted graph.

FIG. 7 illustrates the method 700 of operation of converting a building blueprint into a weighted graph. First, a weighted graph G can be initialized 705. Then, for each floor in the building, 705 through 745 of the method 700 can be repeated.

Figure 2A:
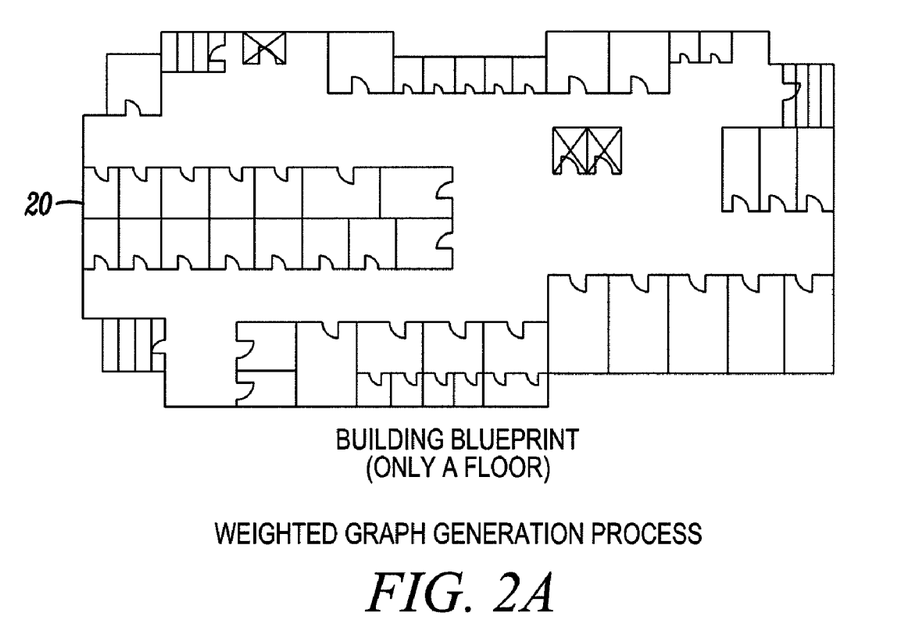
FIG. 2a is a building blueprint of one floor.

For each floor in the building, a blueprint can be retrieved 710. FIG. 2a illustrates a building blueprint 20 of one floor in a building. Then, the areas represented in the floor plan can be assessed and in 715 recognized areas from the blueprint can be represented as a composite area P.

Figure 2B:
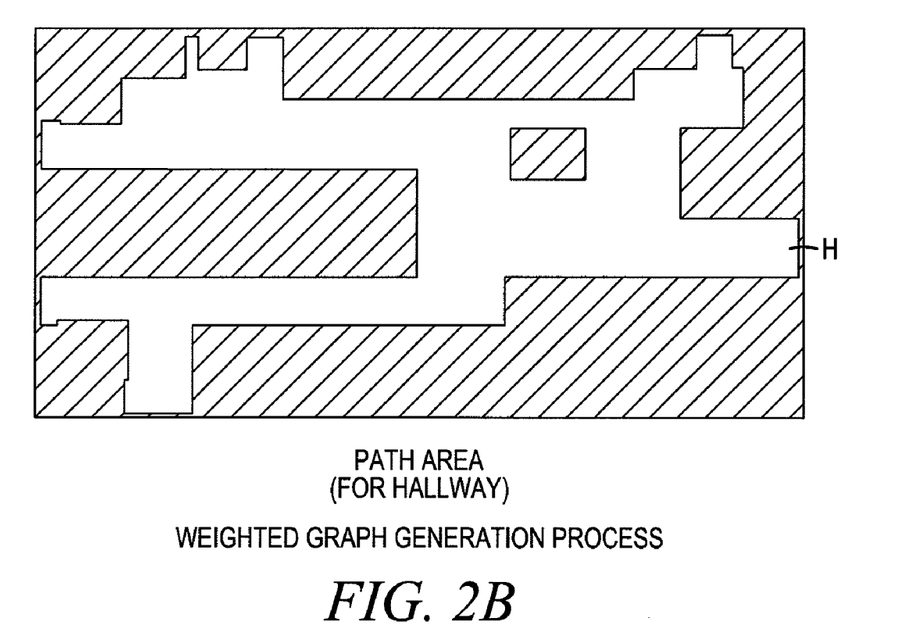
FIG. 2b is the path of a hallway of one floor.

In 720 of the method 700, various compartments on the floor being assessed can be recognized and the area included in the compartments can be calculated as $C_i$ where i=1, 2, ... m. In 725, the hallway area H of the floor being assessed can be calculated be as $H=P-C_1-C_2-\ldots-C_m$. FIG. 2b illustrates the hallway area H.

Figure 2C:
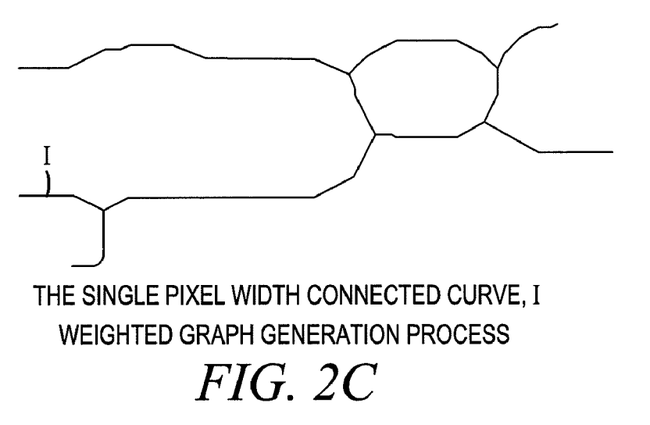
FIG. 2c is the path of a hallway of one floor represented as a single pixel width with connected curve.
Figure 2D:
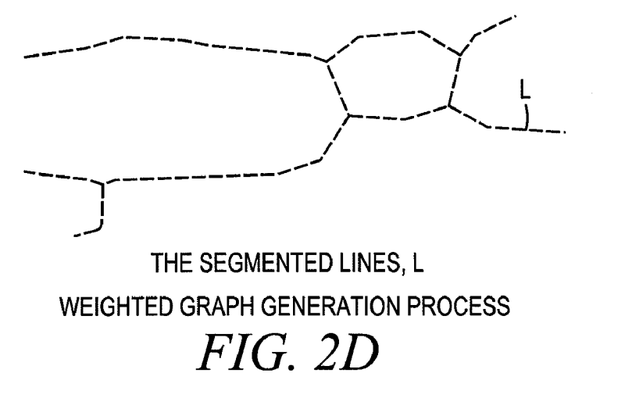
FIG. 2d is the path of a hallway of a particular area represented as single pixel width segmented lines.

Hallway area H can be converted into a single pixel width connected curve I in 730 using a thinning algorithm as known by those of skill in the art. FIG. 2c illustrates the single pixel width connected curve I. Then, in 735, the curve I can be split into segmented lines resulting in a set of lines L. FIG. 2d illustrates the set of lines L.

Figure 2E:
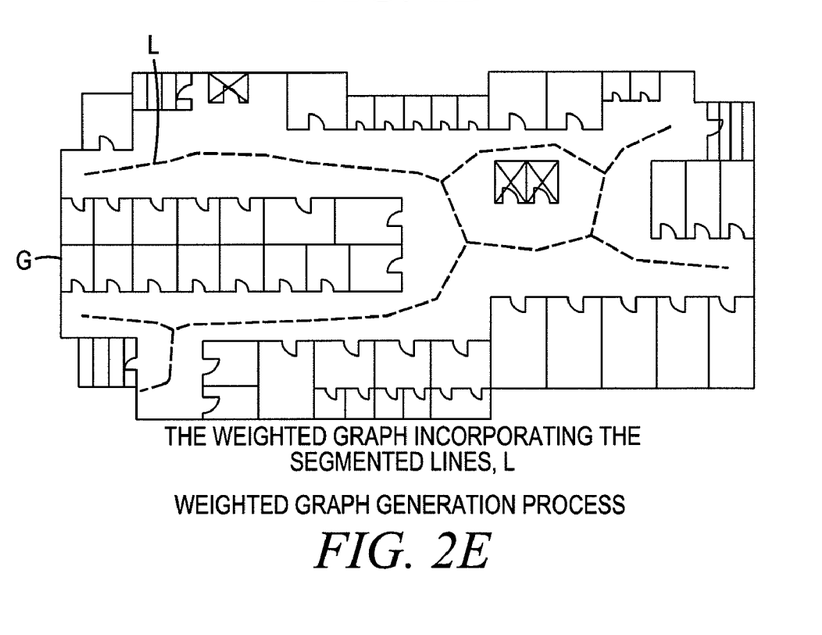
FIG. 2e is a weighted graph of one floor with the path of the hallway represented as single pixel width segmented lines.
Figure 2F:
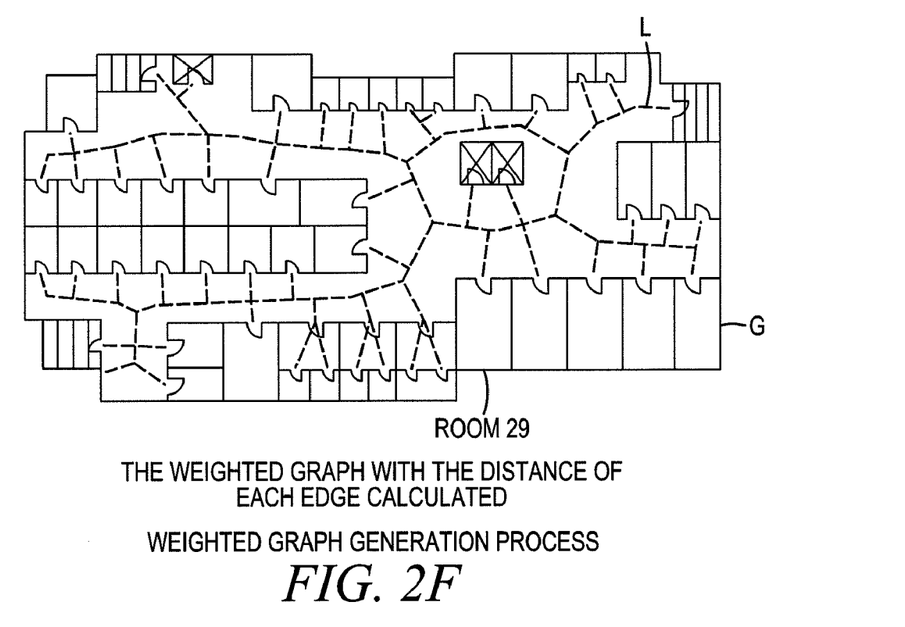
FIG. 2f is a weighted graph of one floor with the distance of each edge represented thereon.

The set of lines L can be added to the null weighted graph G in 740. FIG. 2e illustrates G with the set up lines L added thereto. Then, in 745, the compartments recognized in 720 of the method 700 can be added to the weighted graph G as nodes, and the distances of each edge can be calculated. FIG. 2f illustrates the weighted graph with the distance of each edge calculated.

Figure 2G:
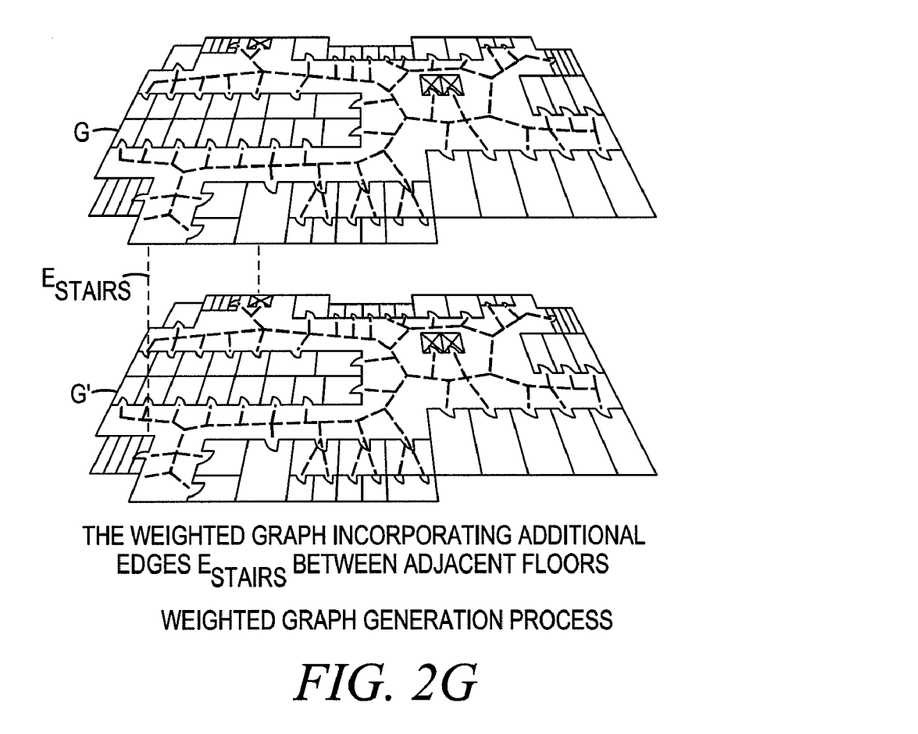
FIG. 2g is a weighted graph of two adjacent floors.

710 through 745 of the method 700 can be repeated for each floor in a building. Portals between adjacent floors, such as elevators and stairs, can be represented as additional edges. In 750, any additional edges representing portals between adjacent floors can be added to the weighted graph. Referring to FIG. 2g, additional edges $E_{stairs}$ connecting weighted graphs of adjacent floors G and G' are shown.

Figure 3A:
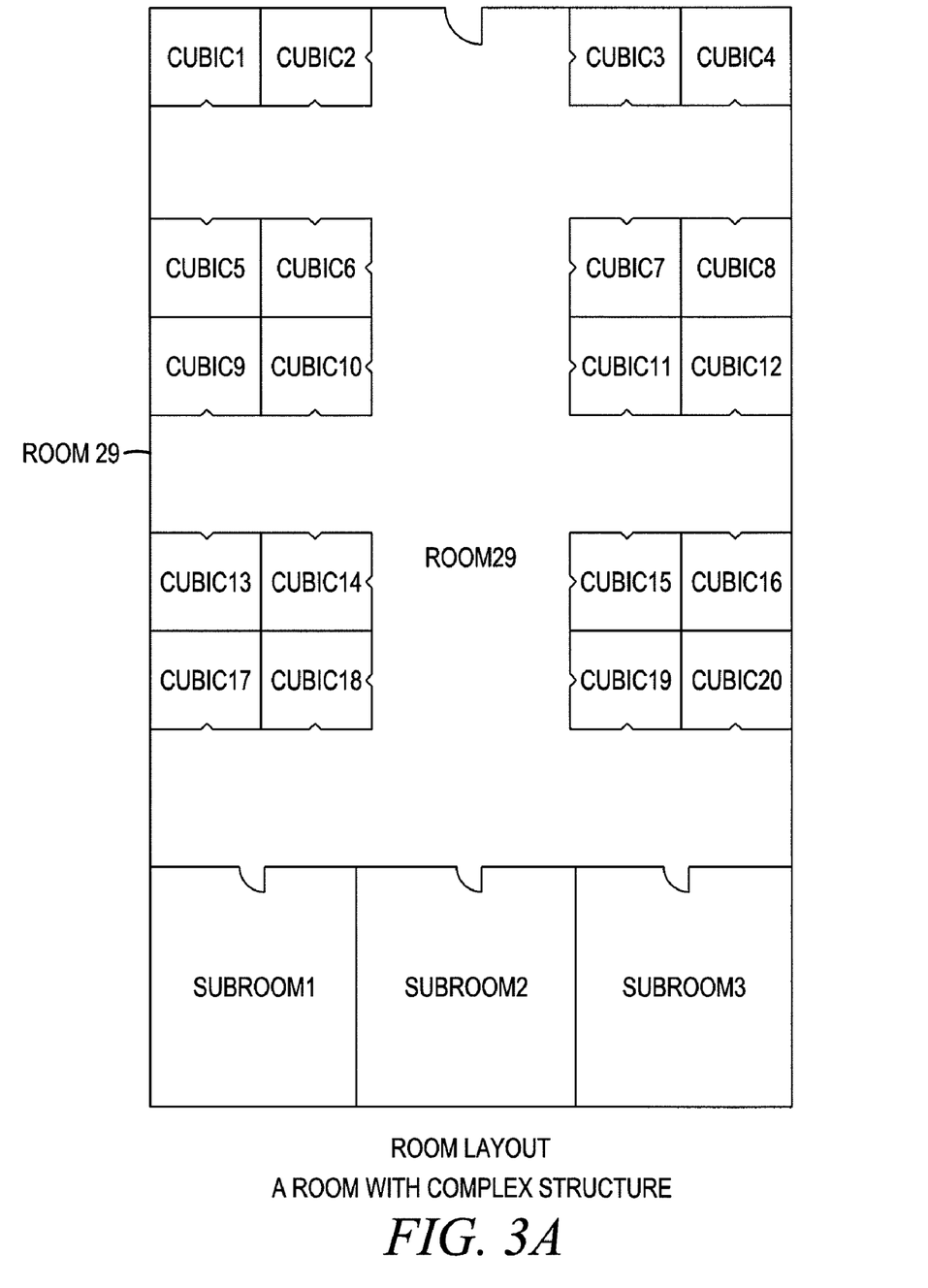
FIG. 3a is a blueprint of a complex room on a floor.

A room in a building can have a complex structure such that, for example, various cubicles or sub-rooms are located within the room. In this event, a sub-weighted graph can be created and added to a primary weighted graph. For example, Room 29 of the weighted graph depicted in FIG. 2f can be a work space with many cubicles and inner rooms as depicted in FIG. 3a.

Figure 3B:
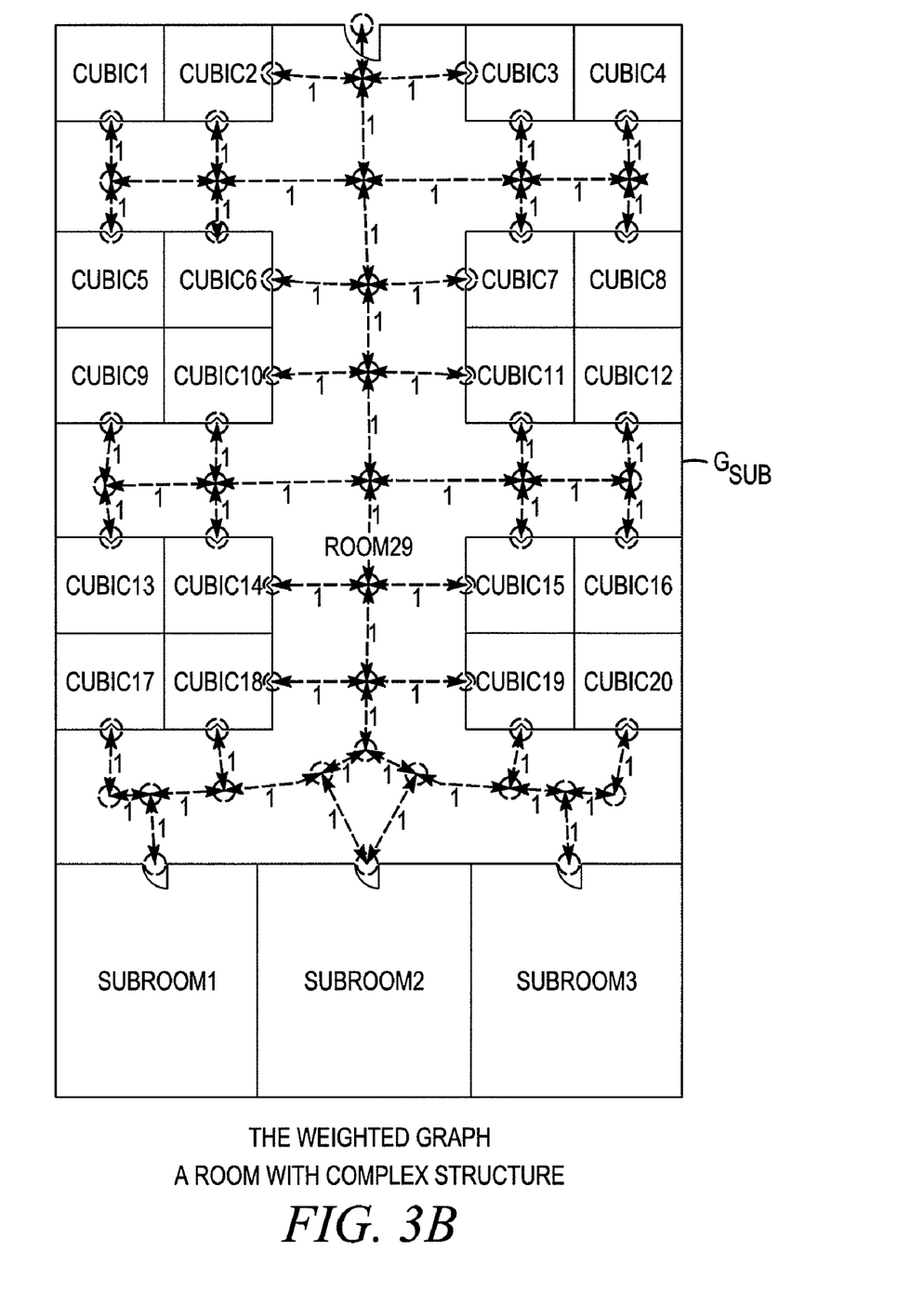
FIG. 3b is a weighted graph of a particular area.

710 through 745 of the method 700 can be repeated for complex structures to create sub-weighted graphs. For example, the method 700 can be used to create a sub-weighted graph $G_{sub}$ of Room 29 as illustrated in FIG. 3b. Then, the sub-weighted graph $G_{sub}$ of FIG. 3b can be added to the primary weighted graph G of FIG. 2g.

An edge in a weighted graph can be assigned one or more weights to represent different meanings depending on the application domain of the weighted graph. The weights may also support multiple views in the same application domain. The views will be accessed by the domain user based on the information he or she needs to access. For example, in a firefighting application, the weight assigned to a particular edge can represent smoke density, temperature, and distance so that a fire fighter can retrieve an optimal path to a fire location and/or occupants of the building can retrieve an optimal route to exit the building taking into consideration all of the building conditions. In an evacuation application, the density of evacuees at a particular location can be considered and assigned as a weight so as to retrieve to most optimal exit route.

Figure 4:
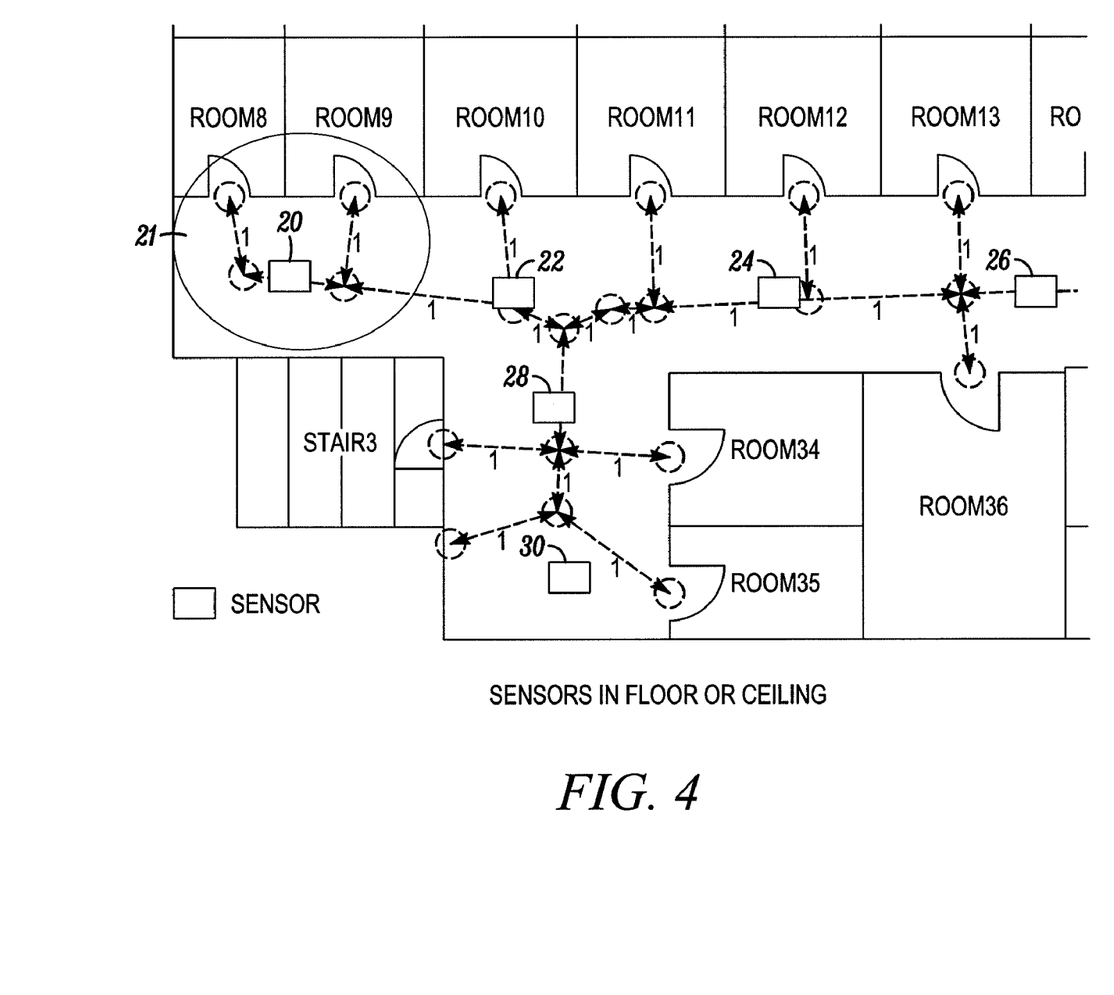
FIG. 4 is a blueprint of a particular area with sensors located throughout.

Weights can be retrieved from sensors and/or from predictive data in the building. Referring to FIG. 4, sensors, for example, 20, 22, 24, 26, 28, and 30, are shown and can be incorporated into the floor or ceiling of each floor in a building. Each sensor, for example 20, has a coverage area 21 associated with that sensor 20.

For example, a sensor 20 can be a smoke detector and coverage area 21 can be associated with sensor 20. Accordingly, the sensor 20 can indicate the smoke density within area 21. The weights assigned to the nodes and edges located within the coverage area 21 can be computed based on the data retrieved from the sensor 20.

U.S. Publication No. 2008/0157984 to Li et al. entitled "Systems and Methods to Predict Fire and Smoke Propagation," which is assigned to the assignee hereof, discloses a method to predict smoke propagation in a building and is hereby incorporated by reference. Methods disclosed in U.S. Publication No. 2008/0157984 can be used to obtain predictive data, and such predictive data can also be used determine weights assigned to various edges.

Figure 8:
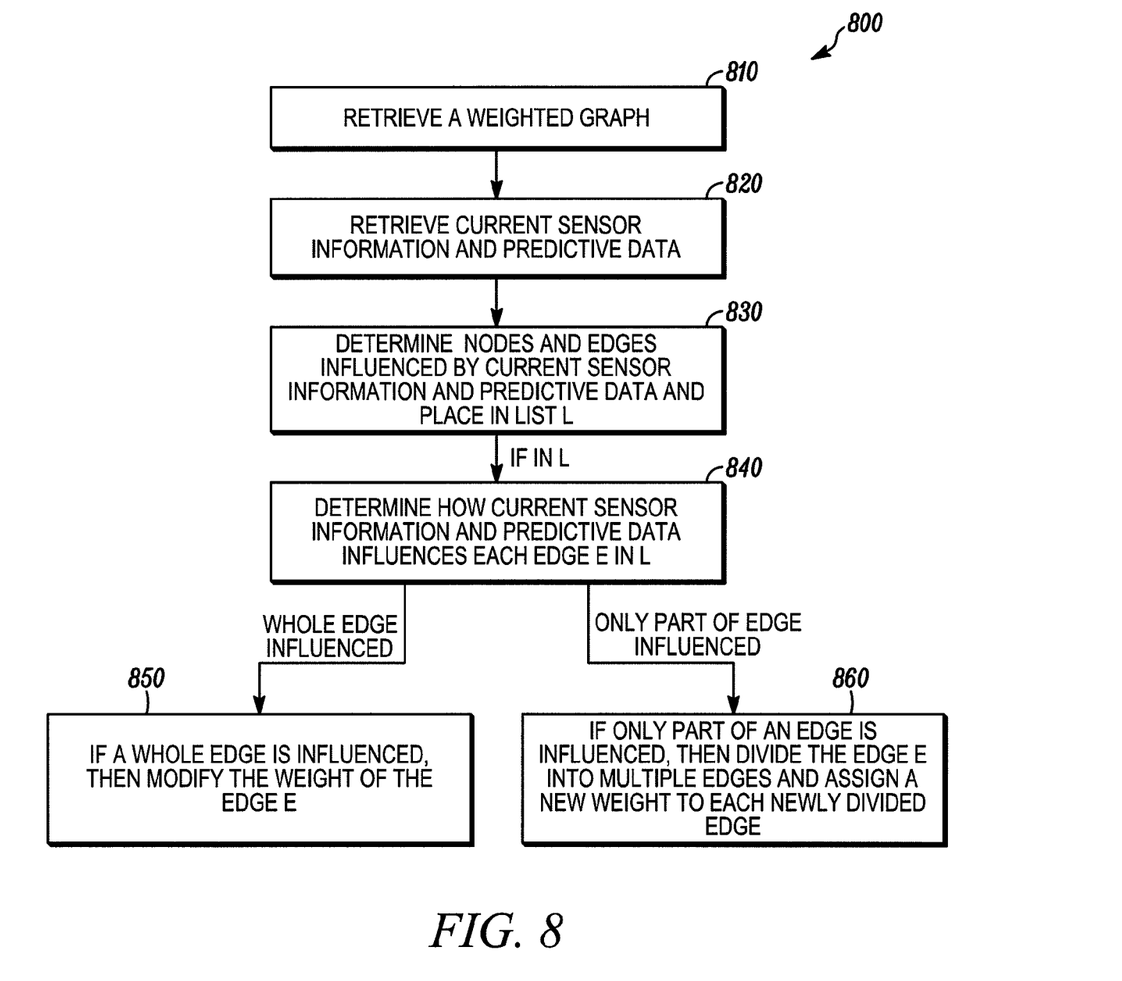
FIG. 8 is a method of operation of updating a weighted graph in real time.

Sensor data and predictive data can be used to update the weights assigned to edges in a weighted graph in real time. FIG. 8 illustrates a method 800 of operation of updating a weighted graph in real time.

Figure 5A:
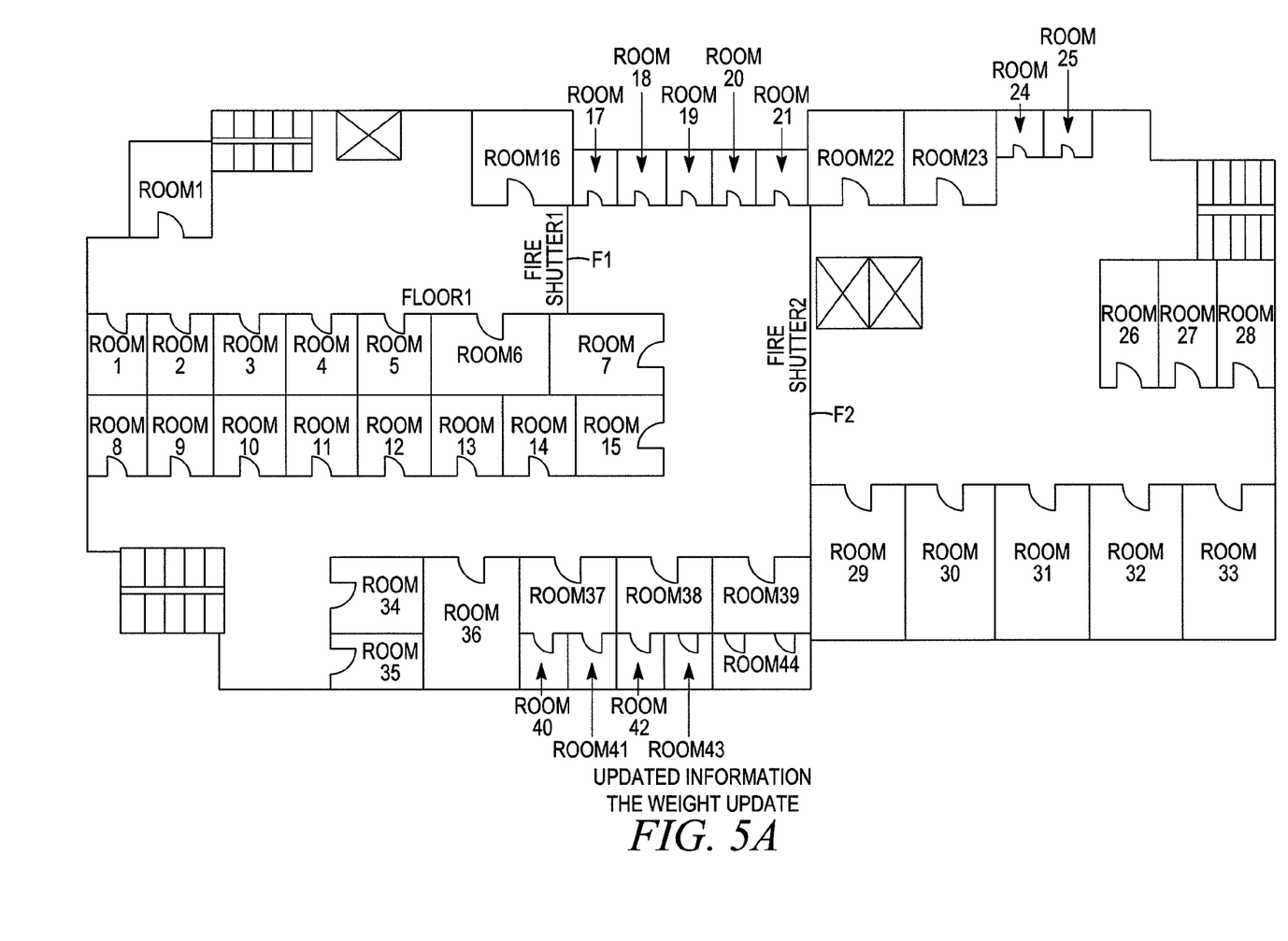
FIG. 5a is a blueprint of a floor with closed fire shutters.

In 810 of the method 800, a weighted graph can be retrieved. Then, the most current information for a sensor or predictive data module can be retrieved in 820. As seen in FIG. 5a, for example, the most current information is that two fire shutters F1 and F2 have been pulled down. The nodes and edges influenced by the most current information can be determined in 830 and placed in a list L.

For edges in L, in 840, a determination can be made as to how the new information influences each edge E. For example, if a whole edge is influenced by the new information, the weight of the edge can be modified in 850. If only a part of an edge is influenced by the new information, the edge E can be divided into multiple edges with new weights being assigned to the newly divided edges 860.

Figure 5B:
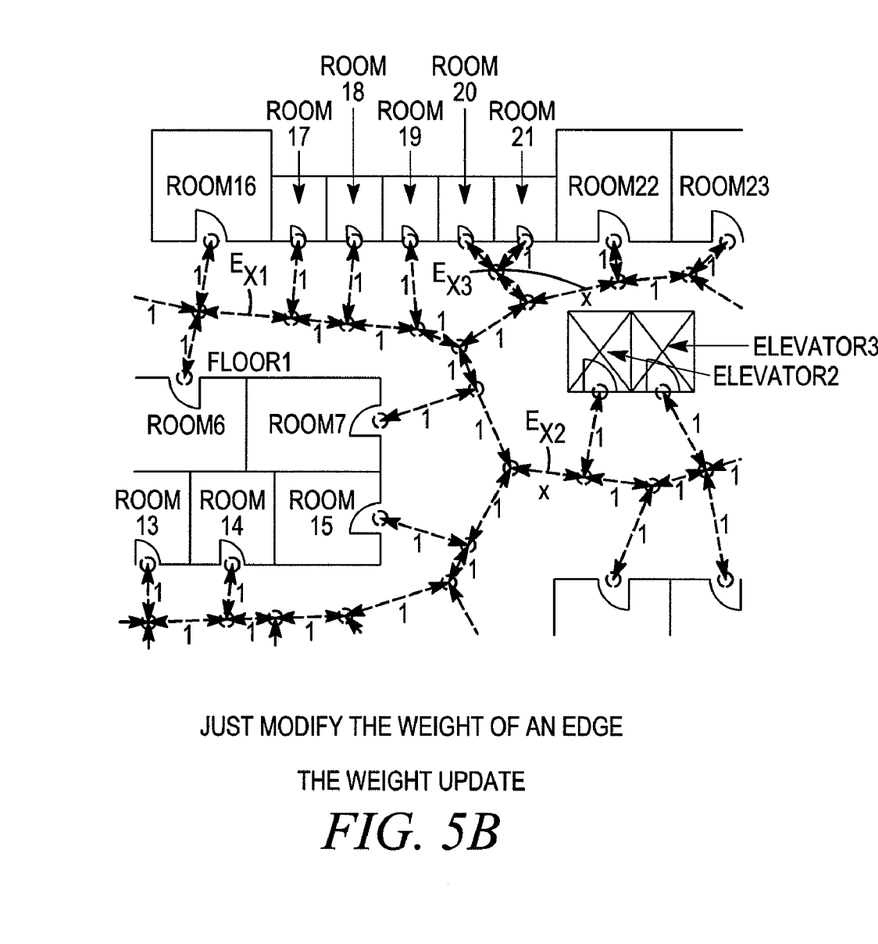
FIG. 5b is a blueprint of a particular area with edges influenced by closed fire shutters set to disable.

For example, as seen in FIG. 5a, the most recent information is that two fire shutters F1 and F2 are pulled down. F1 influences one edge $Ex_1$ and blocks off the hallway. Similarly, F2 blocks off the hallway, but it influences two edges $E_{x2}$ and $E_{x2}$. As seen in FIG. 5a, the whole edges are influenced. Accordingly, the influenced edges $E_{x1}$, $E_{x2}$, and $E_{x3}$ can be set to "disable" or "X" as seen in FIG. 5b.

Figure 5C:
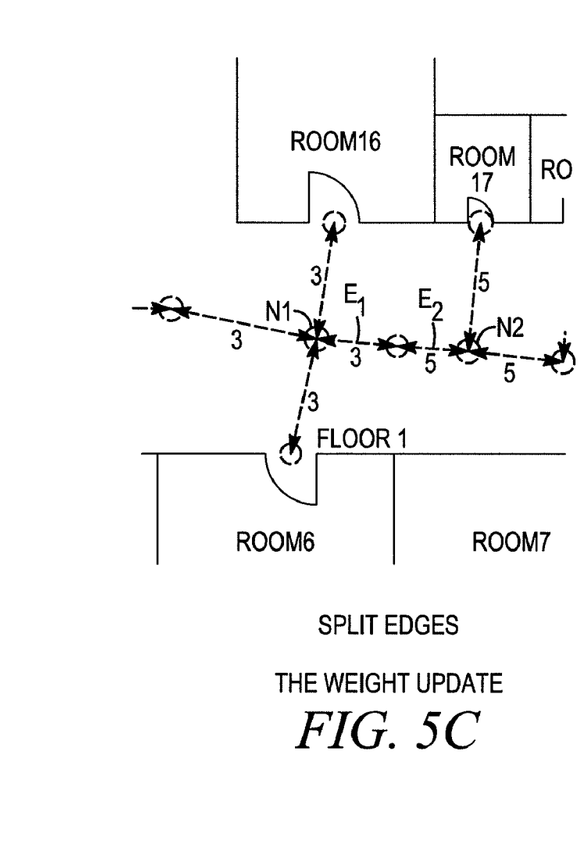
FIG. 5c is a blueprint of a particular area with a single edge split into two edges.

FIG. 5c illustrates an example of only part of an edge being influenced by new information. As seen in FIG. 5c, the edge can be located between two nodes N1 and N2, and smoke detectors near each of the nodes can have different smoke densities. The single edge can be separated into two edges $E_1$ and $E_2$, and the two new edges $E_1$ and $E_2$ can be assigned new weights according to the smoke detector closest to each edge.

Figure 9:
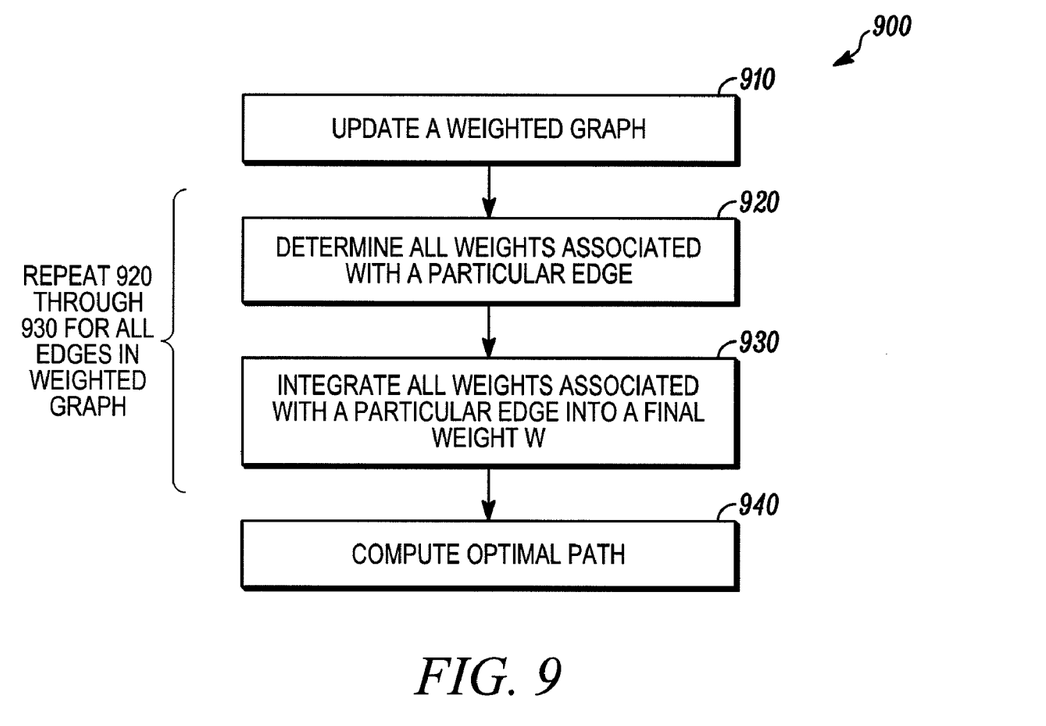
FIG. 9 is a method of operation of retrieving an optimal route.

After a weighted graph is updated in real time, an optimal path can be retrieved. FIG. 9 illustrates a method 900 of operation of retrieving an optimal route. In 910, a weighted graph is updated based on sensor and predictive data.

As described above, one edge can have multiple weights. Accordingly, in 920, all of the weights associated with a particular edge are determined. Then, the final weight of an edge W is computed by integrating all of the weights associated with a particular edge in 930. 920 and 930 of the method 900 can be repeated as necessary for all edges in a weighted graph.

For example, suppose each edge has m weights $w_i$ where i=1, 2, ..., m. A function $F(w_1, w_2, ..., w_m)$ can be defined to map these weights into a final weight according to their different influences on the route. Accordingly, the final weight can be represented as $W=F(w_1, w_2, ..., w_m)$.

In, for example, a firefighting application, to find an optimal emergency exit route, the final weight W for an edge can be defined as the product of distance $w_1$ and smoke density $w_2$. That is, the function $W=w_1 \times w_2$.

Once the final weight, W, for each edge is computed, the optimal route can be computed in 940 using a shortest path algorithm, for example, the Dijkstra algorithm, or other algorithms as are known by those of skill in the art.

After an optimal path is computed, the edges of the optimal path can be drawn in or on a three-dimensional display scene from a starting location to a destination location. U.S. Publication No. 2007/0132756 to Plocher et al. entitled "System and Method for Aiding Spacial Orientation for Persons Using Three-Dimensional Graphical Models of Large Buildings," which is assigned to the assignee hereof, discloses methods to aid in a person's understanding of spatial orientation. U.S. Publication No. 2007/0132756 is hereby incorporated by reference.

Figure 2H:
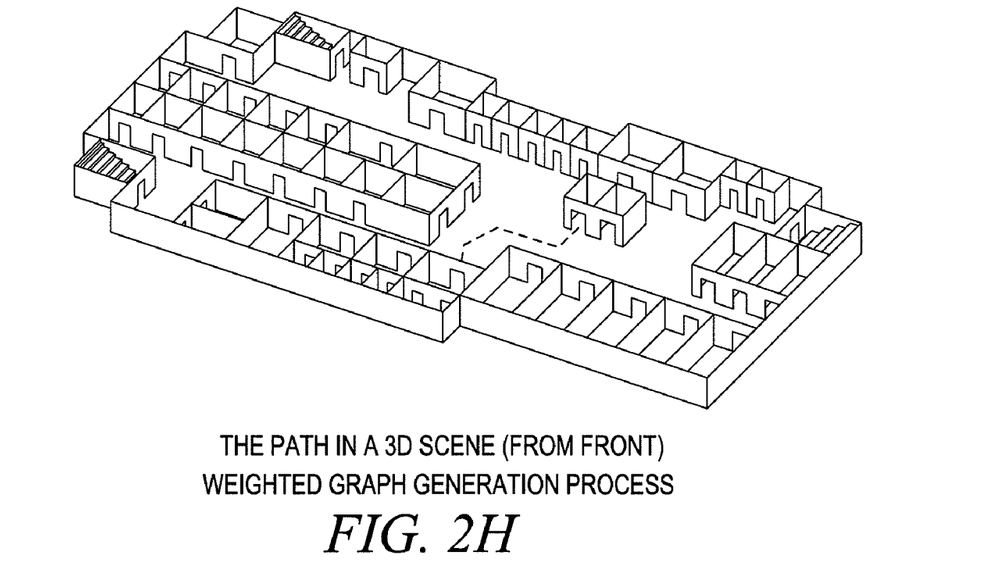
FIG. 2h is a front view of an optimal path in a three-dimensional scene.
Figure 2I:
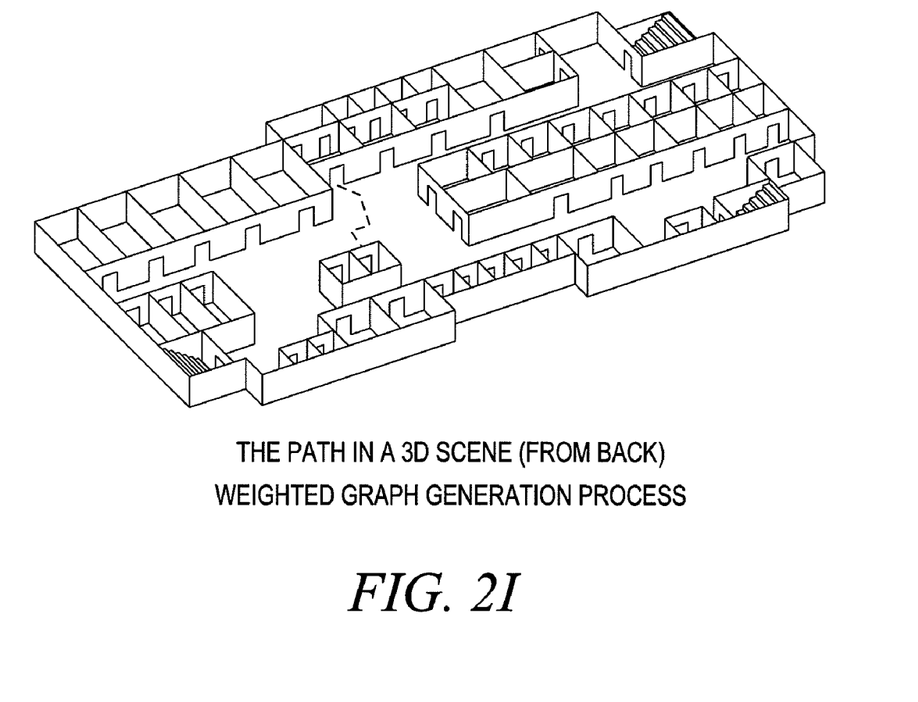
FIG. 2i is a back view of a optimal path in a three-dimensional scene.

For example, FIG. 2h is a front view of an optimal path in a three-dimensional scene, and FIG. 2i is a back view of an optimal path in a three-dimensional scene. As seen in FIGS. 2hi and 2i, the optimal path is from Room 17 on Floor 1 to Room 39 on Floor 2.

In embodiments of the claimed invention, animation, color indications, or other effects as known by those of skill in the art can be added to the optimal path when rendered in either a two-dimensional or three-dimensional scene.

Figure 6:
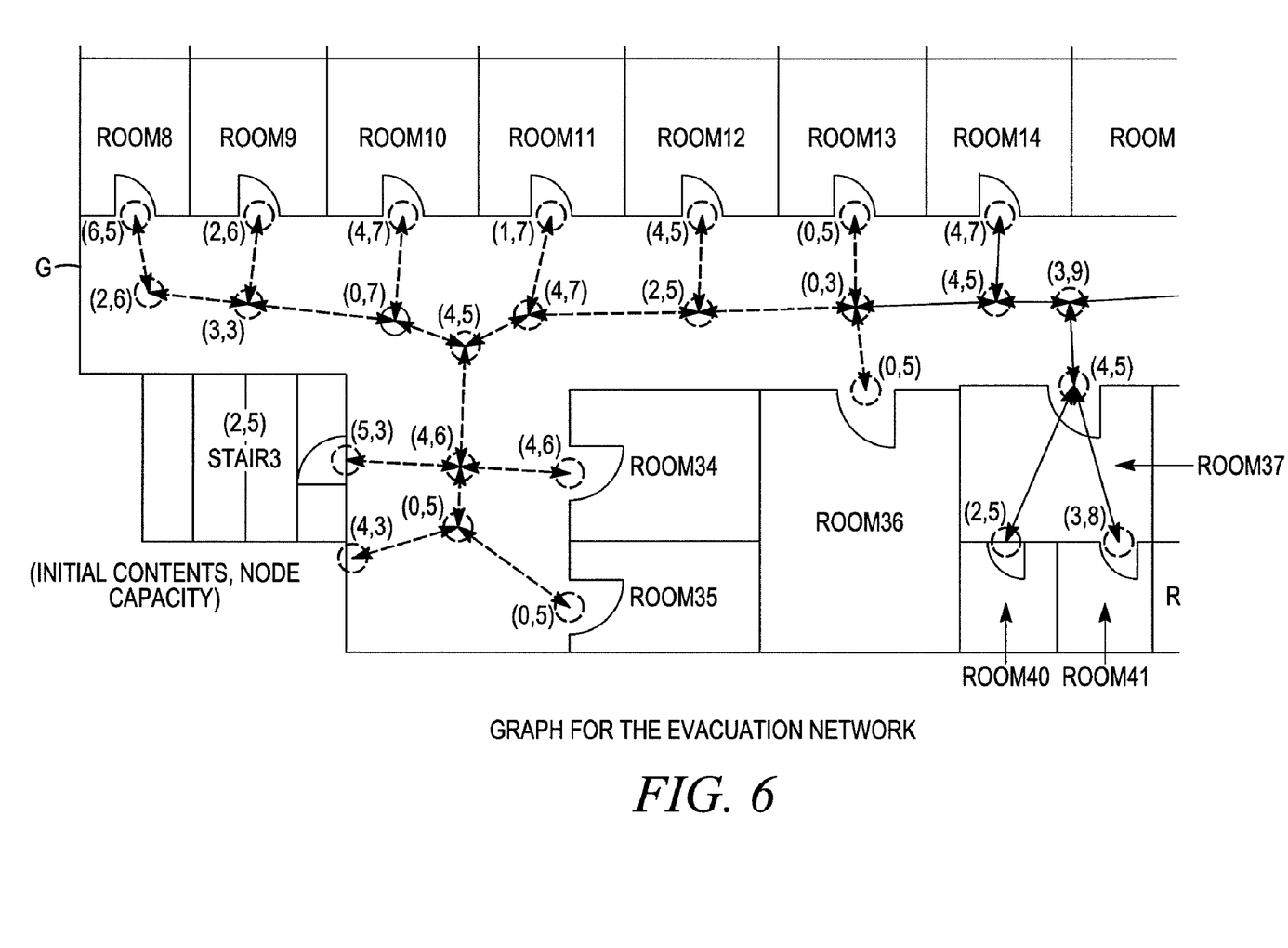
FIG. 6 is a weighted graph of one floor.

In further embodiments of the claimed invention, multiple weights can be assigned to nodes and edges on a graph, and the weights can be used respectively instead of a final weight being computed by integrating all of the weights. For example, in an evacuation for a disaster, terrorism attack, or the like, a weighted graph G can be generated as shown in FIG. 6. Then, a Capacity Constrained Route Planner (CCRP) or an algorithm for network routing as known by those of skill in the art can be used to retrieve the optimal evacuation route.

From the foregoing, it will be observed that numerous variations and modifications may be effected without departing from the spirit and scope of the present invention. It is to be understood that no limitation with respect to the specific apparatus or method illustrated herein is intended or should be inferred. It is, of course, intended to cover by the appended claims all such modifications as fall within the scope of the claims.

What is claimed is:

1. A method of route retrieval comprising:
 a programmed processor initializing a first weighted graph;
 a programmed processor converting a blueprint of an area into a weighted graph where the weighted graph is a set of nodes connected to one another by a set of edges, the nodes of the weighted graph are at least one of a starting point, a way point or destination within the area and where weights assigned to each edge describes the relative cost to travel across that particular edge between a starting or way point and a destination within the area;
 a programmed processor updating the weighted graph in real time where at least some of the weights of the weighted graph are defined as the product of distance and one of smoke density and temperature;
 a programmed processor calculating a plurality of optimal routes in the area using the weights of the weighted graph; and
 displaying the optimal routes wherein said plurality of optimal routes includes at least some partially overlapping routes and wherein upon detection that one or more of the plurality of optimal routes is blocked, the step of updating includes dividing the blocked route into two or more parts and calculating a new plurality of optimal routes based upon the one or more blocked routes.

2. The method of claim 1 wherein converting a blueprint of an area into a weighted graph comprises: a programmed processor recognizing and assessing the area; recognizing and assessing any compartments in the area; calculating an area of a hallway located within the area; converting the hallway area into a single pixel width connected curve; splitting the curve into segmented lines; adding the segmented lines to the first weighted graph representative of edges; adding nodes to the first weighted graph representative of the compartments in the area; and calculating the distance of each edge.

3. The method of claim 2 further including a programmed processor adding additional edges to the first weighted graph representative of portals between adjacent floors of a building.

4. The method of claim 2 further including a programmed processor assigning one or more weights to each edge.

5. The method of claim 4 further including a programmed processor retrieving the one or more weights from at least one sensor in the area.

6. The method of claim 4 further comprising a programmed processor retrieving the one or more weights from predictive data.

7. The method of claim 1 further comprising a programmed processor converting a blueprint of a sub-area into a sub-weighted graph and adding the sub-weighted graph to the first weighted graph.

8. The method of claim 1 wherein updating the weighted graph in real time comprises: a programmed processor retrieving current environmental information; determining any nodes or edges influenced by the current environmental information; determining how the current environmental information influences the nodes or edges influenced by the current environmental information; and adjusting a weight of the nodes or edges influenced by the current environmental information.

9. The method of claim 8 wherein retrieving current environmental information comprises a programmed processor retrieving data from a sensor in the area or retrieving predictive data.

10. The method of claim 8 wherein adjusting a weight of the nodes or edges influenced by the current environmental information further comprises a programmed processor adjusting the weight of an edge when a whole edge is influenced by the current environmental information.

11. The method of claim 8 wherein adjusting a weight of the nodes or edges influenced by the current environmental information further comprises a programmed processor dividing an edge into multiple edges when only a part of an edge is influenced by current environmental information and assigning new weights to the multiple edges.

12. The method of claim 1 wherein calculating an optimal route in the area comprises: a programmed processor determining all weights associated with all edges in the area; computing the final weight of the each edge in the area; and running a shortest path algorithm using the final weights of the edges in the area as input for the algorithm.

13. The method of claim 1 further comprising a programmed processor drawing edges of the optimal route in a three-dimensional scene.

14. Software stored in a computer-readable medium for retrieving an optimal route in an area comprising:
instructions for initializing a first weighted graph;
instructions for converting a blueprint of the area into a weighted graph where the weighted graph is a set of nodes connected to one another by a set of edges, the nodes of the weighted graph are at least one of a starting point, a way point or destination within the area and where weights assigned to each edge describes the relative cost to travel across that particular edge between a starting or way point and a destination within the area;
instructions for updating the weighted graph in real time where at least some of the weights of the weighted graph are defined as the product of distance and one of smoke density and temperature; and
instructions for calculating a plurality of optimal routes in the area using the weights of the weighted graph wherein said plurality of optimal routes includes at least some partially overlapping routes and wherein upon detection that one or more of the plurality of optimal routes is blocked, the instructions for updating divides the blocked route into two or more parts and calculates a new plurality of optimal routes based upon the one or more blocked routes.

* * * * *